Nov. 4, 1941.    R. F. SHROPSHIRE    2,261,190
PHOTOELECTRIC SHOAL WATER SURVEY DEVICE
Filed May 29, 1940    3 Sheets-Sheet 1

INVENTOR
RALPH F. SHROPSHIRE
BY
ATTORNEY

Nov. 4, 1941.  R. F. SHROPSHIRE  2,261,190
PHOTOELECTRIC SHOAL WATER SURVEY DEVICE
Filed May 29, 1940  3 Sheets-Sheet 2

INVENTOR
RALPH F. SHROPSHIRE
BY
ATTORNEY

Nov. 4, 1941.          R. F. SHROPSHIRE                 2,261,190
               PHOTOELECTRIC SHOAL WATER SURVEY DEVICE
                    Filed May 29, 1940       3 Sheets-Sheet 3

INVENTOR
RALPH F. SHROPSHIRE
BY
ATTORNEY

Patented Nov. 4, 1941

2,261,190

UNITED STATES PATENT OFFICE 2,261,190

PHOTOELECTRIC SHOAL WATER SURVEY DEVICE

Ralph F. Shropshire, United States Navy

Application May 29, 1940, Serial No. 337,757

6 Claims. (Cl. 177—311)

(Granted under the act of March 3, 1883, as amended April 30, 1928; 370 O. G. 757)

This invention has for an object to provide a photo-electric cell shoal water survey device and to eliminate the necessity of using drag wires in certain types of survey work in shoal water.

It is necessary to know the minimum depth of water in many shoal water areas and to learn whether there are any obstructions in this minimum depth as speedily as possible, so that they may be removed in any suitable manner. At present, the conventional method of performing this work is to use a drag wire suspended between two parallel moving vessels. Obviously, the catenary of the drag makes it impossible to insure an absolutely uniform minimum depth, for the weight of the wire drag causes the center to be lower than the end. Furthermore, the wire will sometimes ride over the obstruction and fail to indicate its presence.

The present invention eliminates these disadvantages and uncertainties and insures the presence of an absolutely minimum depth and the indication of any obstruction protruding into this minimum depth within the area surveyed.

A further feature of this invention is that the survey can be made by a single vessel, as compared to two vessels using a drag wire.

With the foregoing and other objects in view, the invention consists in the construction, combination and arrangements of parts hereinafter described and illustrated in the drawings, in which.

Figure 1:
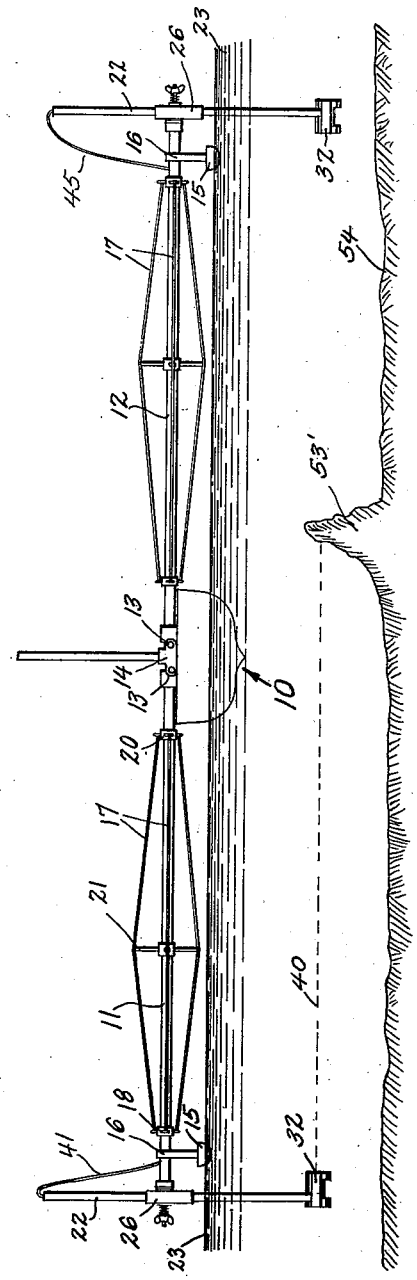
Fig. 1 is a diagrammatic elevational view of the device in operation.
Figure 2:
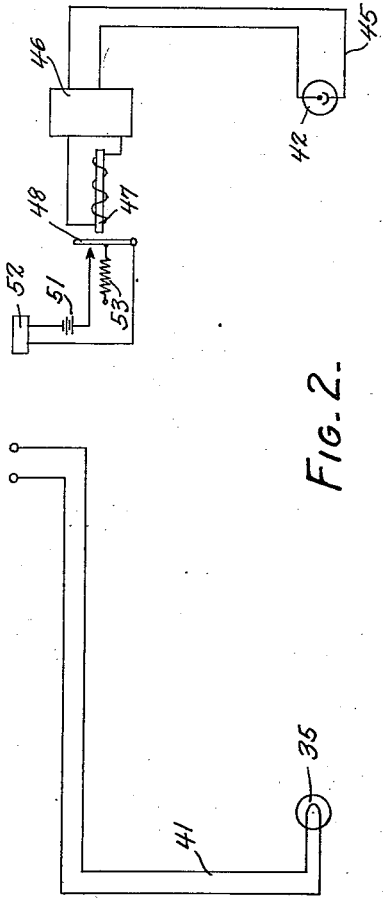
Fig. 2 is a schematic view showing the circuits involved.

There is shown at 10 a survey vessel on which the invention of this device is mounted. This device includes a pair of spar members 11 and 12, each hinged as at 13 to a base member 14 securely anchored on the vessel 10. The spar members 11 and 12 are made of such material that they will be as light as possible consistent with the necessary strength, and are additionally supported adjacent their ends by streamlined pontoons or floats 15, each provided with a supporting mast 16 of sufficient height so as to maintain the spar members 11 and 12 substantially horizontal. In addition, stay wires 17 extending from spar collars 18 to 20 and bowed outwardly to a collar spider 21, may be supplied to reinforce the spar members 11 and 12 and assist them in remaining horizontal.

Figure 6:
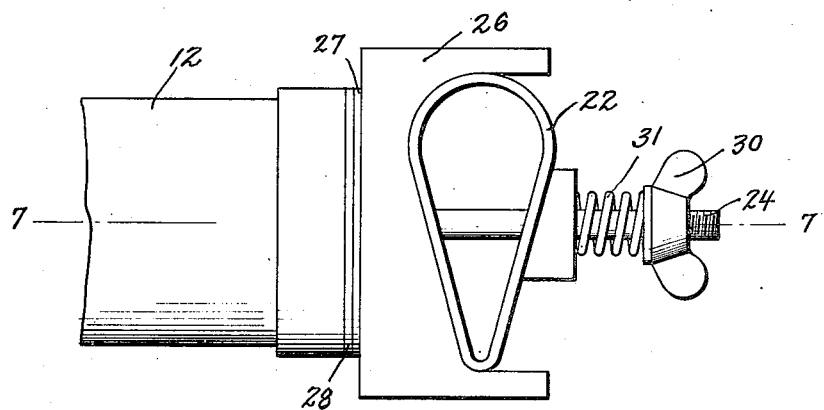
Fig. 6 is a top elevational view of the clutch joint between the spar and the vertical member.
Figure 7:
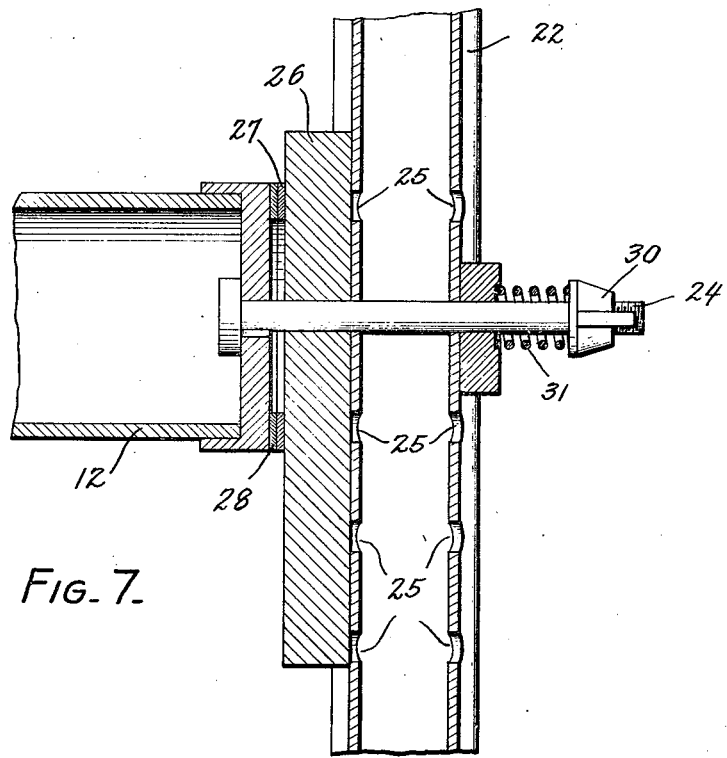
Fig. 7 is a sectional view on line 7—7 of Fig. 6.

Inasmuch as the over-all length from the end of one spar member 11 to the end of the other spar member 12 may be 125 feet, more or less, the spar members 11 and 12 may be made of telescopic tubes, both for the purpose of being adjustable in length and for the purpose of compact stowage when not in use. At the end of each spar member there is provided a vertical member 22, streamlined in outline similar to an airplane strut, as shown in Fig. 6, so that its passage through the water 23 will take place with the minimum resistance. Extending from the end of each spar member may be a bolt 24 which extends through a pair of selected openings 25 in the vertical member 22, so as to hold the vertical member 22 at any selected vertical position within a vertical sleeve 26. This vertical sleeve 26 is provided with a friction clutch plate 27, cooperating with a friction clutch plate 28 on the end of each spar member, the bolt 24 likewise passing through this sleeve 26, a wing nut 30 and spring 31 yieldably holding the vertical sleeve 26 and the vertical member 22 in upright position but permitting the vertical member and its sleeve to pivot about the bolt 24 if the lower portion of the vertical member should strike any obstruction.

Figure 5:
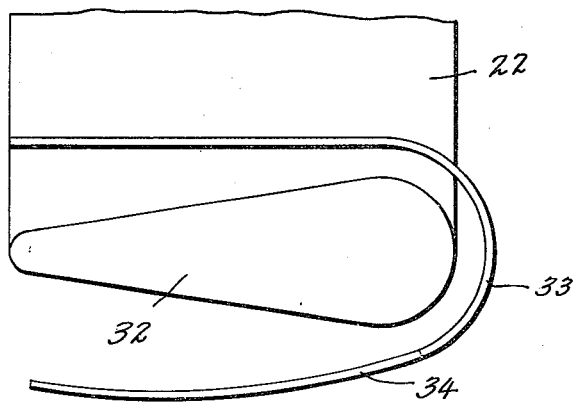
Fig. 5 is an elevational view showing a guard mounted on the under-water housing of Figs. 3 and 4.

Secured to the bottom of the vertical member 22 is an instrument housing 32, this instrument housing 32 being streamlined in shape, as shown in Fig. 5, to facilitate its passage through the water. In addition, extending from the bottom of the vertical member 22 is a guard 33, bifurcated at its end as at 34 so as to absorb the shock should an obstruction be met, and cause the vertical member 22 to yield about its pivot bolt 24 before the instrument within the instrument housing 32 can be damaged. The instrument housing 32, depending from one of the spars as 11, carries an instrument consisting of a light 35 of suitable power, say 500 watts, within the waterproof housing, the light 35 being based within one side of the housing 32, while the waterproof window 36 is provided at the other end.

A suitable reflector 37 may be provided behind the light 35 while an open cylinder 38, leading from the light 35 to the open window 36, confines the projected light to an extremely narrow beam 40. A source of power to the light 35 is provided by electrical conduit 41 extending up the vertical member 22 and through the spar member 11 to a suitable source of energy on board the vessel 10. The exposed portions of conduit 41 are suitably waterproofed, especially where it leaves the top of the vertical member 22 and enters the spar member 11. The instrument housing 32, supported at the end of the vertical member 22 on the other spar member 12, carries a photo-electric cell 42 at the inner end of its cylinder 43 which cylinder extends to its window 44. Extending from this photo-electric cell 42 are suitable conduits 45 leading to an amplifier 46 for operating a relay 47 for holding open a switch 48 in a circuit 50 leading through a source of power 51 to a signal 52.

In operation, when it is desired to survey a shallow lagoon, for instance, to a minimum depth of ten feet, the vertical members 22 will be adjusted at the ends of the spar members 11 and 12 so as to be supported on that selected pair of holes 25 and they will permit exactly ten feet of the vertical member 22 to extend below the level 23 of the water. With the light 35 in operation and the photo-electric cell 42 in position, a light beam 40 will pass from the light 25 to the photo-electric cell 42. As long as this light beam is uninterrupted the photo-electric cell 32 operating through the amplifier 46 activates the relay 47 and holds the switch 48 in open or circuit interrupting position to the signal 52. Should any obstruction, such as a projection 53' from the bottom 54 of the water, interrupt the light beam 40, the photo-electric cell will no longer hold the relay 47 open, and the switch 48 will be closed by its spring 53 to complete the circuit to the signal 52 and indicate the presence of such obstruction, enabling it to be removed, as by dynamiting or other suitable manner. It is obvious that the signal 52 may be a flashing light, a bell or whistle, or any combination thereof, as may be desired, to instantly apprise the operators of the presence of the obstruction.

Figure 3:
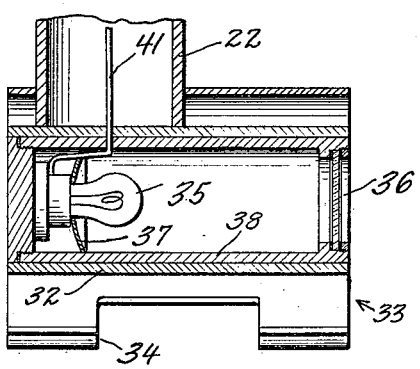
Fig. 3 is a sectional view through the underwater light housing.
Figure 4:
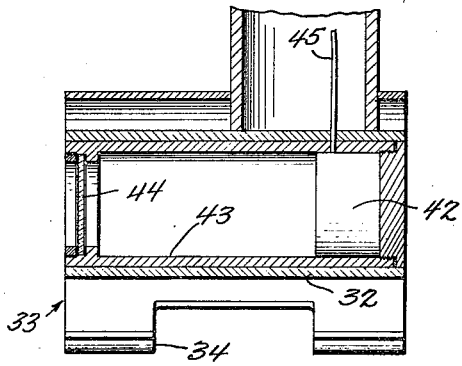
Fig. 4 is a similar sectional view through the under-water photo-electric cell housing.

If, instead of the light beam 40 being interrupted by an obstruction, either instrument housing strike the obstruction, the vertical member 22 carrying the instrument will pivot about its supporting bolts, thus saving the instrument from injury, and at the same time causing the light beam 40 to fail to reach the photo-electric cell 42 and likewise actuate the signal. Also, the upper end of the vertical member 22 projecting above the vertical housing 26 will be observed to be at an angle, showing an obstruction has been met. As apparent from Figs. 3 and 4, the cylinders 38 and 43 will be of sufficient length so as to insure the desired narrowness of the light beam 40, as well as the elimination of undesired stray light actuating photo-electric cell 42.

Other modifications and changes in the proportions and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. A photo-electric cell survey device for underwater survey, comprising means on a movable vessel for supporting a light source and a photo-electric cell at spaced apart positions at a desired depth under-water, said light source providing an under-water beam to activate said photo-electric cell, and a signal means on board said movable vessel actuated by said photo-electric cell whenever the light beam by said light source is interrupted.

2. A photo-electric cell survey device for under-water survey, comprising means on a movable vessel for supporting a light source and a photo-electric cell at spaced apart positions at a desired depth under-water, said light source providing an under-water beam to activate said photo-electric cell, and a signal means on board said movable vessel actuated by said photo-electric cell whenever the light beam by said light source is interrupted, said supporting means comprising a horizontally extending spar means and vertical members at the opposite end of said spar means extending under water to carry said light source and said photo-electric cell.

3. A photo-electric cell survey device for under-water survey, comprising means on a movable vessel for supporting a light source and a photo-electric cell at spaced apart positions at a desired depth under-water, said light source providing an under-water beam to activate said photo-electric cell, and a signal means on board said movable vessel actuated by said photo-electric cell whenever the light beam by said light source is interrupted, said supporting means comprising a horizontally extending spar means and vertical members at the opposite end of said spar means extending under-water to carry said light source and said photo-electric cell, said vertical members being adjustably, pivotally supported at the ends of said spar means.

4. A photo-electric cell survey device for under-water survey, comprising means on a movable vessel for supporting a light source and a photo-electric cell at spaced apart positions at a desired depth under-water, said light source providing an under-water beam to activate said photo-electric cell, a signal means on board said movable vessel actuated by said photo-electric cell whenever the light beam by said light source is interrupted, said supporting means comprising a horizontally extending spar means and vertical members at the opposite end of said spar means extending under water, and float means adjacent the end of said spar means assisting in supporting said spar means.

5. A photo-electric cell survey device for under-water survey, comprising means on a moving vessel for supporting a light source and a photo-electric cell at spaced apart positions at a desired depth under-water, said light source providing an under-water beam to activate said photo-electric cell, a signal means on board said movable vessel actuated by said photo-electric cell whenever the light beam by said light source is interrupted, said supporting means comprising a horizontally extending spar means and vertical members at the opposite end of said spar means extending under water to carry said light source and said photo-electric cell, and a stream-lined waterproof housing at the lower end of each vertical member, said light source being within one of said waterproof housings, said photo-electric cell being within the other of said waterproof housings.

6. A photo-electric cell survey device for under-water survey, comprising means on a movable vessel for supporting a light source and a photoelectric cell at spaced apart positions at a desired depth under water, said light source providing an under-water beam to activate said photo-electric cell, a signal means on board said movable vessel actuated by said photo-electric cell whenever the light beam by said light source is interrupted, said supporting means comprising a horizontally extending spar means and vertical members at the opposite end of said spar means extending under water to carry said light source and said photo-electric cell, a stream-lined waterproof housing at the lower end of each vertical member, said light source being within one of said waterproof housings, said photo-electric cell being within the other of said waterproof housings, and a shock absorbing guard supported on each vertical member and extending forwardly and about each waterproof housing.

RALPH F. SHROPSHIRE.